July 20, 1954
T. B. CHACE
2,684,081
FLUID FLOW CONTROL VALVE
Filed Nov. 2, 1950
2 Sheets-Sheet 1
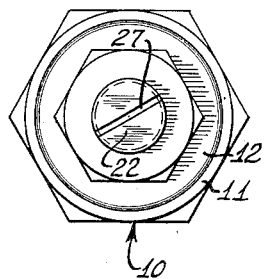
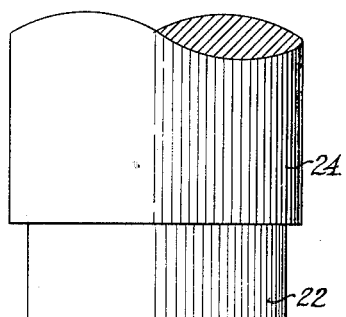
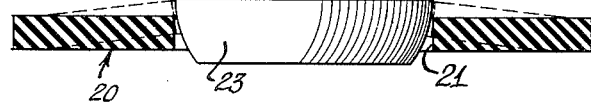
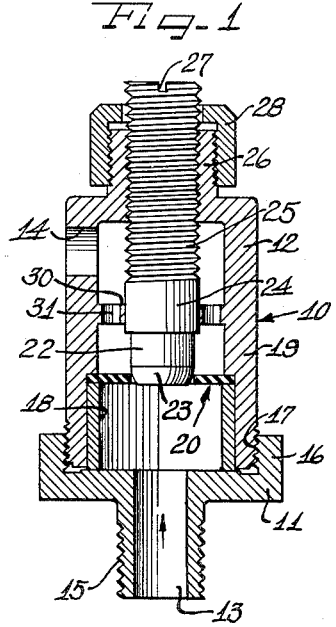
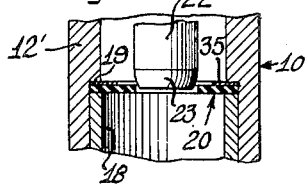
Inventor
Thomas B. Chace
by Hill, Sherman, Meroni, Gross Simpson Attys July 20, 1954
T. B. CHACE
2,684,081
FLUID FLOW CONTROL VALVE
Filed Nov. 2, 1950
2 Sheets-Sheet 2
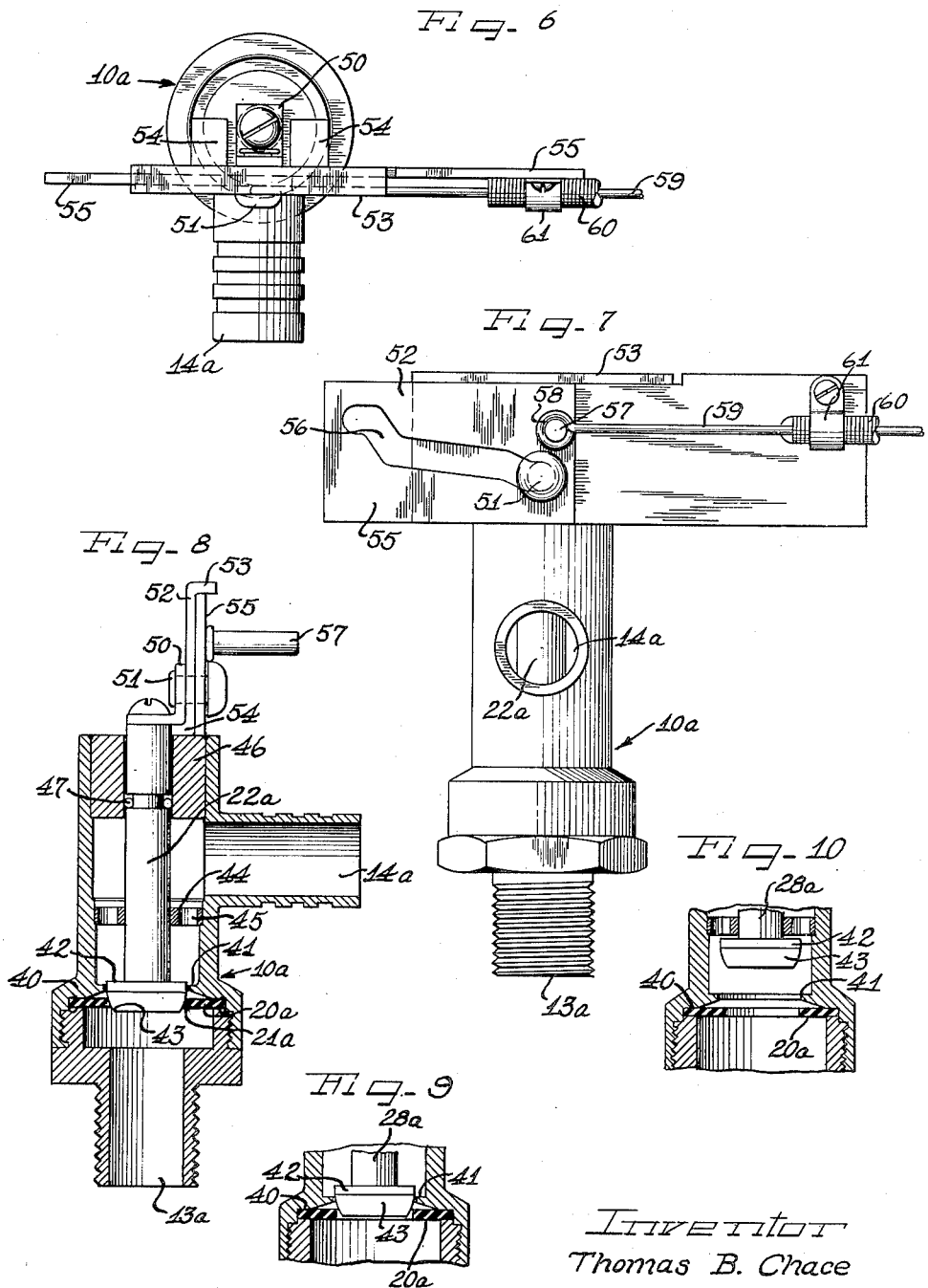
Inventor
Thomas B. Chace Patented July 20, 1954

2,684,081

UNITED STATES PATENT OFFICE 2,684,081

FLUID FLOW CONTROL VALVE

Thomas B. Chace, Chicago, Ill., assignor to The Dole Valve Company, Chicago, Ill., a corporation of Illinois Application November 2, 1950, Serial No. 193,730

2 Claims. (Cl. 137—517)

This invention relates to valves and more particularly to valves controlling fluid flow in such a manner as to obtain a desired relationship between the rate of fluid flow and input pressure.

In various systems it is desirable to maintain a substantially constant rate of fluid flow through a device. In many such systems, the input pressure varies considerably and it is desirable to use a valve regulating the fluid flow so as to maintain it constant.

For example, in automobile heater systems, the pressure from the water pump varies considerably since it is dependent on the speed of the automobile engine. The rate of water flow through the heater varies with this pressure and this variation in flow produces undesirable effects such as hot and cold blasts from the heater. A thermostat cannot control such blasts since there is a time lag between a change in temperature, the action of the thermostat and the actual control of the heating medium. In such systems it is desirable to provide a valve between the water pump and the heater to regulate the rate of flow through the heater.

An object of this invention is to provide a fluid flow control valve having a desired relationship between rate of flow and input pressure.

A further object of this invention is to provide an adjustable fluid flow control valve having a desired relationship between rate of flow and input pressure.

A still further object is to provide means and mechanism for readily adjusting the operation of a fluid flow control valve.

In accordance with the general features of this invention there is provided a casing, a resilient member having a central opening disposed in the casing, a plunger having an end surface spaced from the opening, the end surface of the plunger and the boundary of the opening providing a fluid flow passageway, a resilient member being displaced by fluid under pressure to reduce the size of the passageway, and means for axially positioning the plunger by relative longitudinal movement between it and said opening.

Another feature of the invention relates to the provision of a plunger controlling the rate of flow of fluid and mechanism for controlling the axial position of the plunger.

Other objects and features of this invention will more fully appear from the following detailed description taken in connection with the accompanying drawings which illustrate an embodiment of the invention and in which:

Figure 1 is an elevational view of one type of control valve, certain parts being shown in section;

Figure 2 is a plan view of the valve in Figure 1;

Figure 3 is a detail view on an enlarged scale, partially in section, of parts of the valve in Figure 1;

Figure 4 is a detail view similar to Figure 3 showing a part in a different position;

Figure 5 is a detail view, partially in section, of a portion of the valve of Figure 1 with an additional part added;

Figure 6 is a plan view of another type of valve;

Figure 7 is an elevational view of the valve in Figure 6;

Figure 8 is an elevational view, partially in section, of the valve of Figure 6;

Figure 9 is a detailed view, partially in section, of the valve of Figure 6; and Figure 10 is a detailed view similar to Figure 9 with a part in a different position.

As shown on the drawings:

Referring to Figures 1 and 2 of the drawings, reference numeral 10 designates one type of flow control valve. This valve has a casing formed by a base 11 and a portion 12 connected thereto. Reference numeral 13 designates an opening in the base 11 forming a fluid inlet to the casing and reference numeral 14 designates an opening in the portion 12 forming a fluid outlet from the casing. The base 11 has threads 15 thereon for connecting the casing to any desired source of fluid. The base 11 has a flange 16 into which portion 12 is threaded as designated by reference numeral 17.

A cylindrical member 18 fits into the lower part of portion 12. Above member 18, the portion 12 is of smaller internal diameter to form a shoulder 19. Supported between member 18 and shoulder 19 is a resilient disk 20 having an opening 21 therein. The member 20 may be of any resilient, elastic material. Rubber, or rubber-like material such an neoprene, servene, and the like are suitable.

Referring to Figures 3 and 4, with no fluid under pressure from the inlet 13, the member 20 will be in an unflexed position as shown in full lines. Fluid under pressure from the inlet will contact the lower surface of member 20 and flex it to a displaced position such as shown in dotted lines. In the displacement of member 20, the lower edge of the member at the opening 21 effectively pivots about the inside edge of the shoulder 19. As illustrated in Figures 3 and 4 this pivotal action disposes the lower edge of the member of the opening radially inwardly, thus reducing the diameter of the opening from that in the unflexed position of the member. Since the flow of fluid through an orifice is proportional to the area of the orifice multiplied by the square root of the pressure, it will be seen that this reduction in size of opening 21 in response to increased fluid pressure tends to maintain a constant rate of fluid flow.

Figure 5 shows the valve 10 with a washer 35 of rigid material inserted between shoulder 19 and member 20. This washer effectively forms an inward extension of shoulder 19. The inner edge of the opening in washer 35 then forms a pivot point about which the lower edge of member 20 and opening 21 effectively pivot. This pivot point is disposed closer to the edge of member 20 and opening 21, thus producing a smaller opening with displacement of washer 20. The washer 35, further, reduces the deflection of member 20 so that the valve can be used for a larger input pressure.

Within the casing is an axially movable plunger 22 disposed concentrically with the opening 21 of member 20. The end surface 23 of the plunger 22 is rounded as shown and is movable into the opening 21. The surface 23 and the boundary, or edge of opening 21 define a passageway for fluid flow from the inlet to the outlet of the valve. With reference to Figures 3 and 4, it will be seen that displacement of member 20 at the opening by fluid from the valve inlet reduces the size of this passageway, thus reducing the fluctuation in fluid pressure.

The effect of this reduction in the size of the passageway with increased inlet and fluid pressure augments the effect of reduction in the diameter of the lower edge portion of opening 21, as described above. The total effect obtained is dependent upon the shape of surface 23 of plunger 22, the dimension and resiliency of disk 20, the mounting of disk 20 and the relationship of the plunger with respect to the disk. With proper design, any one of a large number of relationships of fluid flow to fluid pressure can be obtained and, if desired, a substantially constant fluid flow can be obtained over a wide range of input pressure.

The plunger 20 is axially movable. Figures 1, 3 and 4 show three positions of the plunger. In Figure 1, the plunger is in a downward position and completely shuts off the valve; in Figure 3, the plunger is raised from the position of Figure 1 to allow fluid flow through the device; and in Figure 4, the plunger is in a further raised position to allow greater fluid flow. It is thus seen that the valve can be adjusted to obtain any desired amount of flow within limits by axial movement of plunger 22. It may also be noted that, with the proper shape of surface 23 of plunger 21, a substantially constant fluid flow with variations in inlet pressure may be obtained at any one of a number of positions of the plunger.

The plunger 22 has a portion 24 of larger diameter. Above portion 24 the plunger has threads 25 thereon which are inserted in a threaded opening 26 at the upper end of the casing. The upper end of the plunger has a slot 27 therein by which the plunger may be rotated as by a screwdriver to adjust its vertical position. A cap 28 may be screwed onto the upper end of the casing. The casing has an internal, inwardly extending portion 30 into which portion 24 of the plunger fits to guide the plunger for vertical movement and this portion 30 has a plurality of openings 31 for fluid flow therethrough.

Referring to Figures 6, 7 and 8 of the drawings, reference numeral 10a designates another type of flow control valve. The casing of this valve has an inlet 13a and an outlet 14a. A disk 20a of resilient material having an opening 21a is disposed within the casing and seated against a shoulder 40 facing the casing inlet. Extending upwardly and inwardly from the shoulder 40 is a portion 41 providing a surface limiting movement of member 20a.

An axially movable plunger 22a is supported within the casing and has an enlarged portion 42 having a rounded lower surface 43. The operation of resilient member 20a and surface 43 in regulating fluid flow is similar to the operation of member 20 and surface 23, as described in detail with reference to Figures 1 to 5, and need not be described in detail here.

The plunger 22a is guided for axial movement by members 44 and 46 in the casing, member 44 having a plurality of openings 45 for fluid flow therethrough. A sealing washer 47 is disposed on plunger 22a and rides in the opening member 46 to prevent fluid flow therethrough.

Fixed to the top of plunger 22a is a bracket 50 to which a horizontal pin 51 is secured. A bracket 52 is secured to the top of the casing by means of ears 54 and has a slot, not shown, in which pin 51 is movable. A clamp 53 on bracket 52 cooperates with the top of the casing in guiding a plate 55 for horizontal movement. Plate 55 has a cam slot 56 through which pin 51 extends, pin 51 having a head portion holding plate 55 against bracket 52. Horizontal movement of plate 55 thereby moves plunger 22a vertically. Plate 55 has a pin 57 secured thereto disposed in an eye 58 at the end of a rod 59. Rod 59 may be disposed in a flexible cable 60, an end of which is shown attached to bracket 52 by means of a clamp 61. This control of the plunger is useful in applications such as control of water flow through the heater in an automobile, for example, where it is desirable to control the valve at a distance, as from the dashboard.

Figures 8, 9 and 10 show three positions of the plunger 22a. In Figure 8 the plunger is in a downward position in which the valve is closed. In Figure 9 the valve is in an intermediate position in which it regulates the fluid flow through the valve; and in Figure 10, the plunger is in a raised position completely opening the valve. It is thus seen that complete control over the valve operation is obtained.

The valves described above may be operated in any position. Certain parts have been described as having vertical or horizontal movement, or described as having vertical or horizontal positions with respect to other parts. Such descriptions are for the purpose of clarity, only, and should not be construed as limitations.

It will be understood that modifications and variations may be effected without departing from the scope of the novel concepts of the present invention.

I claim as my invention:

1. In a fluid control device including a casing having a fluid inlet and an outlet, a flow control annulus of flexible elastomeric material supported in said casing in the path of the flow with its inner edge deflectible toward the outlet in response to variations in pressure, a plunger-like element with its extremity aligned with and projecting into the opening of said annulus for cooperation with said inner edge of said annulus in controlling the rate of flow of fluid to said outlet, and means for relatively moving said plunger extremity and edge to change the controlled rate of flow of fluid, said plunger extremity having a reduced end portion with an external annular surface of generally curved predetermined configuration for cooperation with said annular edge to permit a given rate of flow for each movement of change in the relative changes of position of said extremity and edge.

2. In a fluid control device including a casing having a fluid inlet and an outlet, a flow control annulus, at least in part of resilient rubber-like material, supported transversely in said casing in the path of the flow of fluid and with a radially inner edge portion resiliently deflectible by virtue of said material toward the outlet in response to variations in pressure, a plunger-like element with an axial portion aligned with and projecting into the opening of said edge portion for cooperation therewith in controlling the rate of flow to said outlet, and means for relatively moving said plunger portion and edge portion to change the controlled rate of flow, said axial plunger portion comprising an external annular surface of generally curved cross-sectional configuration telescopingly cooperating with said edge portion for effecting a given rate of flow for each movement of change in the relative changes of position of said plunger portions and edge portion.

References Cited in the file of this patent

UNITED STATES PATENTS

| Number | Name | Date |
| --- | --- | --- |
| 1,038,527 | Coleman | Sept. 17, 1912 |
| 1,159,214 | Gueux | Nov. 2, 1915 |
| 1,380,787 | Ellmauer | June 7, 1921 |
| 1,997,404 | Hamilton | Apr. 9, 1935 |
| 2,089,279 | Loeffler | Aug. 10, 1937 |
| 2,117,303 | Dinzl | May 17, 1938 |
| 2,444,677 | Rosenblum | July 6, 1948 |
| 2,454,929 | Kempton | Nov. 30, 1948 |
| 2,489,932 | Rosenblum | Nov. 29, 1949 |